Patented July 4, 1933

1,916,627

UNITED STATES PATENT OFFICE

JOSEF MERSCH, OF LEVERKUSEN, GERMANY, ASSIGNOR TO GENERAL ANILINE WORKS, INC., OF NEW YORK, N. Y., A CORPORATION OF DELAWARE

PROCESS OF PREPARING 1.7-DIHYDROXYNAPHTHALENE

No Drawing. Application filed February 12, 1931, Serial No. 515,423, and in Germany February 20, 1930.

The present invention relates to a process of preparing 1.7-dihydroxynaphthalene.

In accordance with the invention the valuable 1.7-dihydroxynaphthalene, hitherto only obtainable in poor yield, (see Journal of the Chemical Society, volume 110, page 1709) is easily produced in a very satisfactory yield by splitting off the sulfonic acid group or groups from the 1.7-dihydroxynaphthalene-3-sulfonic acid or 1.7-dihydroxynaphthalene-3.6-disulfonic acid by heating these acids in dilute aqueous water soluble inorganic or organic acids. Further I have found that instead of using the 1.7-dihydroxynaphthalene-3-sulfonic- or-3.6-disulfonic acid as starting material in my process there may be started with the 7-amino-1-hydroxynaphthalene-3-sulfonic or 7-amino-1-hydroxynaphthalene-3.6-disulfonic acid respectively, the amino group simultaneously being substituted by the hydroxy group. All the compounds coming into consideration for the purpose of the invention as starting materials may be represented by the general formula:

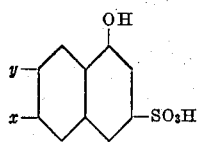

wherein $x$ stands for hydrogen or a sulfonic acid group and $y$ stands for a hydroxy or an amino group.

As acids suitable for carrying out my process there may be mentioned by way of example formic acid, sulfuric acid, hydrochloric acid, phosphoric acid. The conditions of working may be varied within the widest limits, generally I use aqueous acids of the kind referred to above in a strength from about 1 to about 30% at temperatures ranging between about 150 and about 210° C. It is to be mentioned that the concentration of the acid and the temperature required depend on each other in such a manner that the lower acid concentrations require higher temperatures and vice versa. It is of course understood that generally the process may be carried out by working at the upper limits of the acid concentrations and temperatures stated, but in some cases care must be taken that the temperature is kept low enough to avoid by-reactions. The yield is about 75 to 85% of theory.

The invention is illustrated by the following examples, without being limited thereto:

Example 1.—1 part by weight of 1.7-dihydroxynaphthalene-3-sulfonic acid is heated in an autoclave at about 200° C. for 5–10 hours with 10 parts of water and 3 parts by weight of concentrated sulfuric acid. The pressure is about 15 atmospheres. The resulting solution is saturated with sodium chloride, whereby the dihydroxynaphthalene is separated. It is filtered off by suction and purified by customary methods. The product so obtained has the melting point 178° C. given in the literature.

Example 2.—1 part by weight of 1.7-dihydroxynaphthalene-3.6-disulfonic acid is heated in an autoclave at 180° C. for 5 hours with 13 parts of water and 0.2 parts by weight of concentrated sulfuric acid. The pressure is about 12 atmospheres. The working up is the same as that described in Example 1.

Example 3.—1 part by weight of 1.7-dihydroxynaphthalene-3-sulfonic acid is heated in an autoclave at 185° C. for 5 to 10 hours with 20 parts of water and 0.1 part by weight of hydrochloric acid (24° Bé.). The pressure is about 12 to 13 atmospheres. The working up is that described in Example 1.

Example 4.—1 part by weight of 1.7-dihydroxynaphthalene-3-sulfonic acid is heated in an autoclave at about 200° C. for 10 hours with 20 parts of water and 0.5 part by weight of formic acid. The pressure is about 15 atmospheres. The working up is that described in Example 1.

Example 5.—1 part by weight of 7-amino-1-hydroxynaphthalene-3-sulfonic acid is heated in an autoclave at about 200° C. for 5 to 10 hours with 5 parts of water and 0.05 parts by weight of concentrated sulfuric acid under a pressure of 14–15 atmospheres. The working up is that described in Example 1.

Example 6.—1 part by weight of 7-amino-1-hydroxynaphthalene-3.6-disulfonic acid is heated in a closed vessel under a pressure of 14–15 atmospheres at 200° C. for 5–10 hours with 15 parts of water and 0.1 part by weight of concentrated sulfuric acid. The product is worked up as described in Example 1.

*Example 7.*—1 part by weight of 7-amino-1-hydroxynaphthalene-3-sulfonic acid is heated in a closed vessel under a pressure of 14–15 atmospheres at about 200° C. for 5–10 hours with 5 parts of water and 0.1 part by weight of ortho-phosphoric acid. The product is worked up as described in Example 1.

I claim:

1. The process which comprises heating a compound of the general formula:

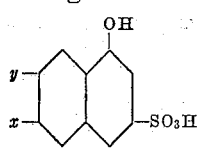

wherein $x$ stands for hydrogen or a sulfonic acid group and $y$ stands for a substituent of the group consisting of the hydroxy- and amino-groups, in aqueous acid of about 1 to about 30% strength at a temperature between about 150 and about 210° C.

2. The process which comprises heating a compound of the general formula:

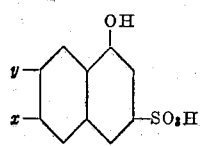

wherein $x$ stands for hydrogen or a sulfonic acid group and $y$ stands for a substituent of the group consisting of the hydroxy- and amino-groups, in aqueous mineral acid of about 1 to about 30% strength at a temperature between about 150 and about 210° C.

3. The process which comprises heating a compound of the general formula:

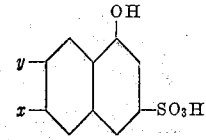

wherein $x$ stands for hydrogen or a sulfonic acid group and $y$ stands for a substituent of the group consisting of the hydroxy- and amino-groups, in an aqueous sulfuric acid of about 1 to about 30% strength at a temperature between about 150 and about 210° C.

4. The process which comprises heating 1 part by weight of 1.7-dihydroxynaphthalene-3-sulfonic acid for 5 to 10 hours with 10 parts of water and 3 parts by weight of concentrated sulfuric acid at a temperature of 200° C.

5. The process which comprises heating 1 part by weight of 7-amino-1-hydroxynaphthalene-3-sulfonic acid for 5 to 10 hours with 5 parts of water and 0.05 parts by weight of concentrated sulfuric acid at a temperature of 200° C.

In testimony whereof, I affix my signature.

JOSEF MERSCH.